Aug. 6, 1929.　　F. T. BAILEY ET AL　　1,723,001
PRODUCTION OF WHITE LEAD
Filed June 22, 1926
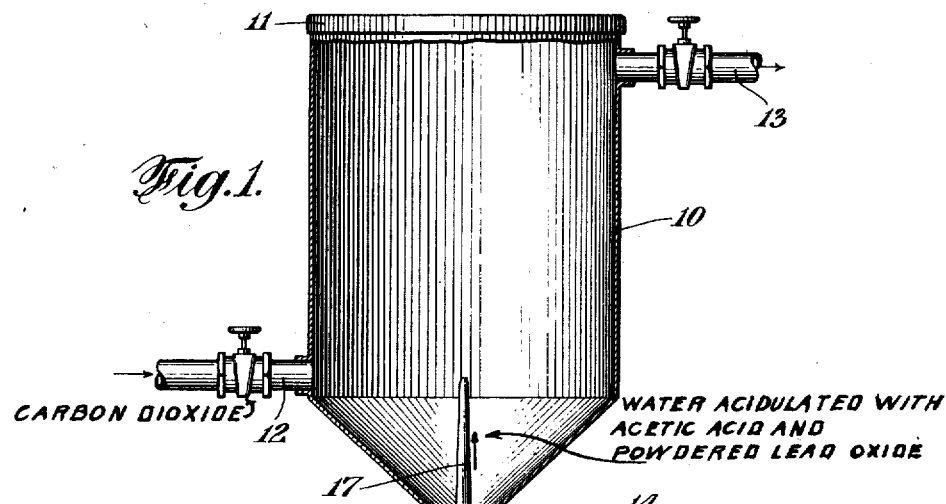
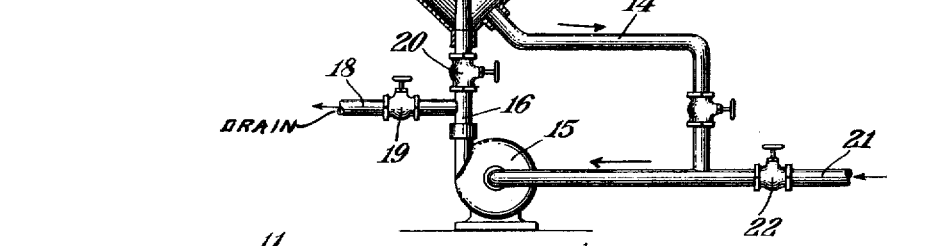
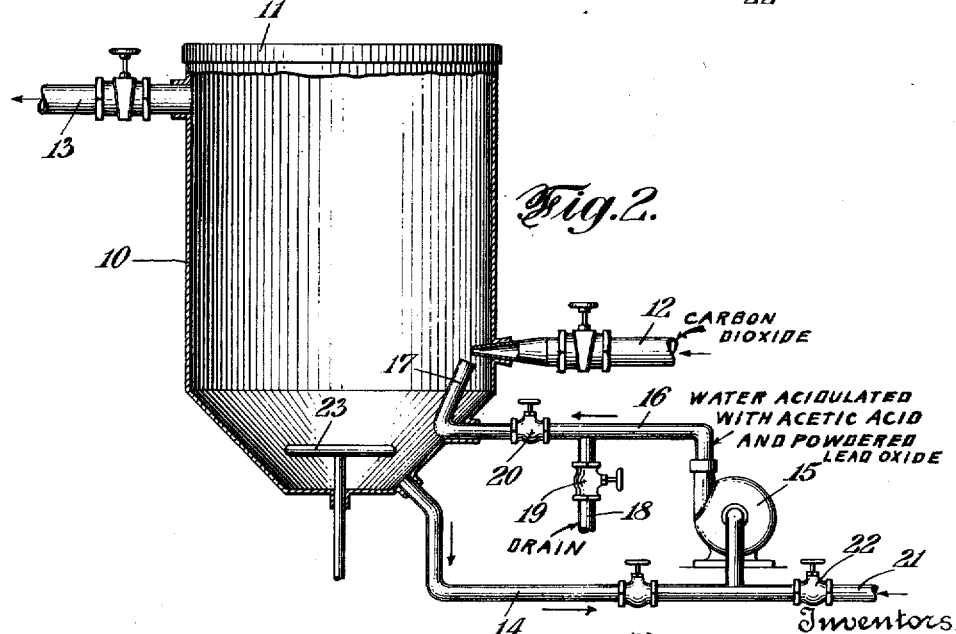

Patented Aug. 6, 1929.

1,723,001

UNITED STATES PATENT OFFICE.

FRANK T. BAILEY AND WILSON AUSTIN, OF NEW YORK, N. Y.

PRODUCTION OF WHITE LEAD.

Application filed June 22, 1926. Serial No. 117,677.

This invention relates to the production of white lead and has for an object to produce white lead of superior quality in a more expeditious and economical manner than heretofore.

According to the invention, powdered anhydrous lead oxide or litharge is passed through a corroding atmosphere of aqueous vapors, acetic acid and carbon dioxide gas. Preferably this is accomplished by introducing a mixture of acidulated water and powdered litharge into a tank having an outlet at its bottom leading to a pump, the discharge of which is connected to a nozzle arranged within the tank so that liquid drawn out of the tank is sprayed through the upper portion of the chamber and allowed to drain back to the bottom of the tank. While the mixture is being thus sprayed, carbon dioxide gas is passed through the tank in such a manner that the mixture and gas are brought into intimate contact.

In this process the litharge is converted into white lead without the formation of any appreciable stable intermediate products. Instead of forming hydrated lead acetate which is then converted by carbon dioxide into white lead, as in the former processes, it appears that according to this process the acetic acid or other equivalent hydrating agent forms a hydrated particle, but this action taking place as it does in a carbonating atmosphere is not completed to the extent of forming the acetate or other hydrate. In other words, in the preferred method the acetic acid converts the litharge into hydrated lead oxide, but the carbon dioxide having a greater affinity for this hydrated particle than has acetic acid, the carbonate is formed with this particle instead of the acetate. The present process requires only one-half to one per cent of pure acetic acid by weight of the litharge used as distinguished from the 10% by weight or more previously used.

By starting the process with thoroughly oxidized lead, the corrosion is not delayed pending the oxidation of metallic lead which process is very slow at the low temperature necessary to permit hydration, and there is no possibility of there being any finely divided particles of unoxidized lead in the finished product to affect its color. By using powdered litharge, no attrition or grinding off of particles or eating in by corroding agents is necessary. The water is used as a mechanical means or carrying agent for the lead oxide particles, so that it is possible repeatedly to diffuse them through the corroding atmosphere, and is also used as one of the chemical agents necessary for corrosion. A practically perfect mixture is obtained of a solid, liquid and a gas, the strength of the mixture or the percentage of the various chemical agents being subject to accurate regulation. The lead oxide particles are exposed to all the corroding agents simultaneously, thereby permitting the chemical reactions to take place as fast as possible.

With this process, white lead is obtained directly from litharge or any lower oxide of lead or mixture of such oxides without employing any other chemical agents than those now used for corroding any particular oxide; also white lead is produced in commercial quantities from the lead oxides in a matter of a few minutes, a hitherto unheard of accomplishment and 100% corrosion of the oxide is obtained. White lead produced according to this process is physically different and much superior, as it has a greater opacity or hiding power than old Dutch white lead in the ratio of 18 to 10 and is whiter than any white lead now on the market; in fact, whiter than zinc oxide.

Other objects, novel features and advantages of the invention will be apparent from the following specification and accompanying drawings, wherein Figure 1 discloses one type of apparatus for producing white lead according to the invention; and Fig. 2 discloses a modified form of apparatus.

Referring now to Fig. 1, 10 is a tank having a downwardly converging bottom and provided with a removable cover 11 through which a charge may be introduced into the tank. Near the lower part of the tank 10 is provided a valve control inlet 12 and near the top of the tank is provided a valve control outlet 13. A pipe 14 leads from the bottom of the tank 10 to the inlet of a pump 15, the outlet of which is connected by pipe 16 to a nozzle 17 projecting into the tank 10. A pipe 18 leads from the pipe 16 to a storage tank not shown. Valves 19 and 20 are provided in the pipe 18 and 16 so that liquid discharged from the pump may be directed into the cylinder through the jet or nozzle 17 or may be diverted to the storage tank when corrosion is completed. A pipe 21 leading from a water supply is connected to the pipe 14 and is controlled by valve 22. By means of this connection, fresh water may be circulated through the system thoroughly to wash out the corroded lead before recharging the apparatus.

In producing white lead with this apparatus, a charge of acidulated water and powdered anhydrous lead oxide or litharge is introduced into the tank in a sufficient quantity to fill the bottom of the tank 10 up to the inlet 12 and the circulating system. Carbon dioxide gas is fed through the tank 10 at a rate sufficient to accomplish corrosion. The pump 15 is started and the fluid mixture with which the apparatus has been charged is sprayed through the nozzle 17 into the body of the tank 10 thereby diffusing the litharge through a corrosive atmosphere consisting of aqueous vapor, acetic acid and carbon dioxide gas. The lead particles and mist fall through the tank and are collected at the bottom thereof from whence they are carried to the pump and again forced up through the nozzle into the corroding atmosphere. This action is continued until all the lead oxide has been corroded which takes place in a very short time. The valve 20 may then be closed and the valve 19 opened and the liquid containing what is now 100% white lead pumped to the storage tank where it may be washed and further treated in the usual manner. By operating the valve 20 water may be supplied to the tank 10 to be circulated through the apparatus to clean it and make it ready for another charge.

An almost perfect mixture of very finely divided particles of lead oxide and the necessary corroding agents is continuously effected and the proportions may be so regulated that corrosion takes place in a remarkably short time. All parts of the charge are evenly and uniformly subjected to the corroding action of the atmosphere in the chamber so that corrosion progresses at a uniform rate throughout the charge, giving a completely uniform product both as respects hydration and carbonation, of the formula $2PbCO_3.Pb(OH)_2$. It is a well-known fact that in white lead when subjected to corroding gases for any length of time as in the old processes, the percentage of carbonate is increased and hydration decreased. In our product, this is avoided and a white lead composed of particles of substantially uniform analysis secured and one in which there are no overdone particles or tendency toward crystalline growth.

With this process, litharge is converted directly into white lead without the formation of any appreciably stable intermediate products. The acetic acid, of which there is only one-half to one per cent, by weight of the litharge used, forms hydrated lead oxide from the litharge, but because this action takes place in a carbonating atmosphere and the carbon dioxide has a greater affinity for hydrated lead oxide than has acetic acid, hydrated lead carbonate is formed directly instead of a lead acetate being formed and then converted into carbonate.

The apparatus disclosed in Fig. 2 operates upon substantially the same principle as that disclosed in Fig. 1. In this modification, the inlet 12 for the gas constitutes a nozzle and the inlet 17 for the mixture of acidulated water and litharge discharges directly in line with the nozzle. An agitator 23 is provided for keeping the litharge well mixed with the water.

Experiments have shown that there is a great physical difference as well as a certain difference in chemical analysis between white lead resulting from reactions taking place in the moist atmosphere of acetic acid and gas and white lead resulting from the same chemical agents acting in a body of liquid through which a gas is passed. A better product is produced more expeditiously and economically by repeated and thorough diffusion of very fine particles of lead oxide through an aqueous corroding atmosphere.

In describing our process, we have used acetic acid as the hydrating agent or catalyst, for the reason that this agent is the one generally used in making white lead. However, other hydrating agents may be used, such as ammonium acetate, nitric acid and other agents, which will produce similar chemical reactions. It is to be understood that, where we have described or claimed the use of acetic acid as a hydrating agent, we do not limit ourselves thereto but include the use of other equivalent hydrating agents within the scope of this invention.

What we claim as new and desire to secure by Letters Patent of the United States is:—

1. The method of making corroded white lead which comprises passing powdered anhydrous lead oxide through a corroding atmosphere of aqueous vapors, acetic acid and carbon dioxide.

2. The method of making corroded white lead which comprises spraying a mixture of acidulated water and powdered lead oxide through an atmosphere of carbon dioxide.

3. The method of making corroded white lead which comprises passing powdered litharge repeatedly through a corroding atmosphere of aqueous vapor, acetic acid and carbon dioxide.

4. The method of making corroded white lead which comprises repeatedly spraying a mixture of acidulated water and powdered litharge through a current of carbon dioxide.

5. The process of forming corroded white lead which comprises spraying a mixture of acidulated water and powdered litharge through an atmosphere of carbon dioxide, collecting the mixture and repeating the spraying until all the litharge is corroded.

6. The method of making corroded white lead which comprises bringing powdered anhydrous lead oxide into contact with carbon dioxide gas in the presence of aqueous vapor and acetic acid.

7. The process of making corroded white lead which comprises hydrating litharge in a carbonating atmosphere.

8. The process of making corroded white lead which comprises hydrating and carbonating lead oxide by diffusion through an aqueous atmosphere of corroding gases.

9. The process which comprises converting litharge directly into corroded hydrated lead carbonate in an atmosphere of corroding gases.

10. A corroded white lead composed of non-crystalline particles substantially all of the composition $2PbCO_3.Pb(OH)_2$.

11. A corroded white lead composed of non-crystalline particles of substantially uniform hydration and carbonation.

12. In a method of making corroded white lead, the use of water as a mechanical means of diffusing a lead oxide through an atmosphere of corroding gases.

In testimony whereof, we have signed our names to this specification.

FRANK T. BAILEY.
WILSON AUSTIN.

CERTIFICATE OF CORRECTION.

Patent No. 1,723,001.         Granted August 6, 1929, to

FRANK T. BAILEY ET AL.

It is hereby certified that error appears in the printed specification of the above numbered patent requiring correction as follows: Page 1, line 83, for the word "hinding" read "hiding"; and that the said Letters Patent should be read with this correction therein that the same may conform to the record of the case in the Patent Office.

Signed and sealed this 10th day of September, A. D. 1929.

M. J. Moore,
Acting Commissioner of Patents.

(Seal)

4. The method of making corroded white lead which comprises repeatedly spraying a mixture of acidulated water and powdered litharge through a current of carbon dioxide.

5. The process of forming corroded white lead which comprises spraying a mixture of acidulated water and powdered litharge through an atmosphere of carbon dioxide, collecting the mixture and repeating the spraying until all the litharge is corroded.

6. The method of making corroded white lead which comprises bringing powdered anhydrous lead oxide into contact with carbon dioxide gas in the presence of aqueous vapor and acetic acid.

7. The process of making corroded white lead which comprises hydrating litharge in a carbonating atmosphere.

8. The process of making corroded white lead which comprises hydrating and carbonating lead oxide by diffusion through an aqueous atmosphere of corroding gases.

9. The process which comprises converting litharge directly into corroded hydrated lead carbonate in an atmosphere of corroding gases.

10. A corroded white lead composed of non-crystalline particles substantially all of the composition $2PbCO_3.Pb(OH)_2$.

11. A corroded white lead composed of non-crystalline particles of substantially uniform hydration and carbonation.

12. In a method of making corroded white lead, the use of water as a mechanical means of diffusing a lead oxide through an atmosphere of corroding gases.

In testimony whereof, we have signed our names to this specification.

FRANK T. BAILEY.
WILSON AUSTIN.

CERTIFICATE OF CORRECTION.

Patent No. 1,723,001.  Granted August 6, 1929, to

FRANK T. BAILEY ET AL.

It is hereby certified that error appears in the printed specification of the above numbered patent requiring correction as follows: Page 1, line 83, for the word "hinding" read "hiding"; and that the said Letters Patent should be read with this correction therein that the same may conform to the record of the case in the Patent Office.

Signed and sealed this 10th day of September, A. D. 1929.

M. J. Moore,
Acting Commissioner of Patents.

(Seal)